US011293366B2

(12) United States Patent
Conte et al.

(10) Patent No.: US 11,293,366 B2
(45) Date of Patent: Apr. 5, 2022

(54) DATA SENSING AND ESTIMATION

(71) Applicant: GM Global Technology Operations LLC, Detroit, MI (US)

(72) Inventors: Giuseppe Conte, Turin (IT); Carmen Pedicini, Turin (IT); Vincenzo Alfieri, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/279,242

(22) Filed: Feb. 19, 2019

(65) Prior Publication Data

US 2020/0263622 A1 Aug. 20, 2020

(51) Int. Cl.
*F02D 41/14* (2006.01)
*G06F 9/455* (2018.01)
*G06F 17/13* (2006.01)
*G06F 16/9035* (2019.01)
*G05B 23/02* (2006.01)
*F02B 37/12* (2006.01)
*F02D 41/00* (2006.01)
*G06N 7/00* (2006.01)

(52) U.S. Cl.
CPC .......... *F02D 41/1447* (2013.01); *F02B 37/12* (2013.01); *F02D 41/0047* (2013.01); *G05B 23/0297* (2013.01); *G06F 9/45558* (2013.01); *G06F 16/9035* (2019.01); *G06F 17/13* (2013.01); *G06N 7/00* (2013.01)

(58) Field of Classification Search
CPC ............. F02D 41/1446; F02D 41/1447; F02D 41/1433; F02D 2041/1433; F02D 41/0047–0077; F01N 11/002–005; F01N 9/005; F02B 77/086; F02B 37/12–24; G06N 7/00
USPC .............................. 701/102, 108; 73/114.69; 123/568.21–568.28
See application file for complete search history.

(56) References Cited

U.S. PATENT DOCUMENTS

| | | | |
|---|---|---|---|
| 10,337,384 B2* | 7/2019 | Martin | F02D 41/1446 |
| 2006/0167613 A1* | 7/2006 | Barba | F02M 26/47 |
| | | | 701/108 |
| 2011/0257871 A1* | 10/2011 | Takigawa | F02D 41/1458 |
| | | | 701/104 |
| 2016/0003180 A1* | 1/2016 | McNulty | F02B 37/013 |
| | | | 701/102 |
| 2016/0160777 A1* | 6/2016 | Hanawa | G01K 7/42 |
| | | | 374/144 |

(Continued)

*Primary Examiner* — Robert A Werner
(74) *Attorney, Agent, or Firm* — Quinn IP Law

(57) ABSTRACT

A system or method for determining virtual data of a system, relative to a measurement point having a sensor located nearby, is determined by a controller. The system calculates modeled data at the measurement point, filters the modeled data to determine filtered data, and calculates a differential between the modeled data and the filtered data to determine a compensation term. The system also determines raw-sensed data from the sensor at the measurement point, and combines that raw-sensed data with the compensation data to calculate the virtual data at the measurement point. In some configurations, the modeled data is determined from a physics-based model. Furthermore, filtering the modeled data may include using a low-pass filter, and a time constant for the low-pass filter may be calculated based on operating conditions of the system.

13 Claims, 3 Drawing Sheets

(56) References Cited

U.S. PATENT DOCUMENTS

2017/0362979 A1* 12/2017 Nakada ................ F01N 3/0885
2018/0372011 A1* 12/2018 Hagari .................... F01N 9/005

* cited by examiner

DATA SENSING AND ESTIMATION

INTRODUCTION

This disclosure generally relates to improved sensing, determination, and estimation of data or parameters. In one configuration, the disclosure relates to determining temperatures of internal combustion engines.

SUMMARY

A method for determining, and a controller configured to determine, virtual data or parameters of a system are described herein. The virtual data or virtual parameter is determined relative to a measurement point having a sensor located generally nearby, and is determined by a controller. The method includes calculating modeled data at the measurement point, filtering the modeled data to determine filtered data, and calculating a differential between the modeled data and the filtered data to determine a compensation term. The method also includes determining raw-sensed data from the sensor at the measurement point, and combining the raw-sensed data with the compensation data to calculate the virtual data at the measurement point. The virtual data is data generated with both sensed and modeled data.

In some configurations, the modeled data is determined from a physics-based model. Furthermore, filtering the modeled data may include using a low-pass filter, and a time constant for the low-pass filter may be calculated based on operating conditions of the system at the measurement point. A structural control system configured to execute the methods described herein is also provided.

In some configurations, the method and system are applied to internal combustion engines, such that the virtual data may be temperatures of portions of the internal combustion engine or powertrain related thereto. For example, the measurement point may be located at the exhaust of the internal combustion engine and is sensing exhaust gases. Additionally, the physics-based model may be a function with inputs including fuel, intake temperature, and airflow to the internal combustion engine. Calculating the time constant for the low-pass filter may be determined as a function of the time change of mass flow through a turbine of a turbocharger.

The above features and advantages, and other features and advantages, of the present subject matter are readily apparent from the following detailed description of some of the best modes and other configurations for carrying out the disclosed structures, methods, or both.

DETAILED DESCRIPTION

Figure 1:
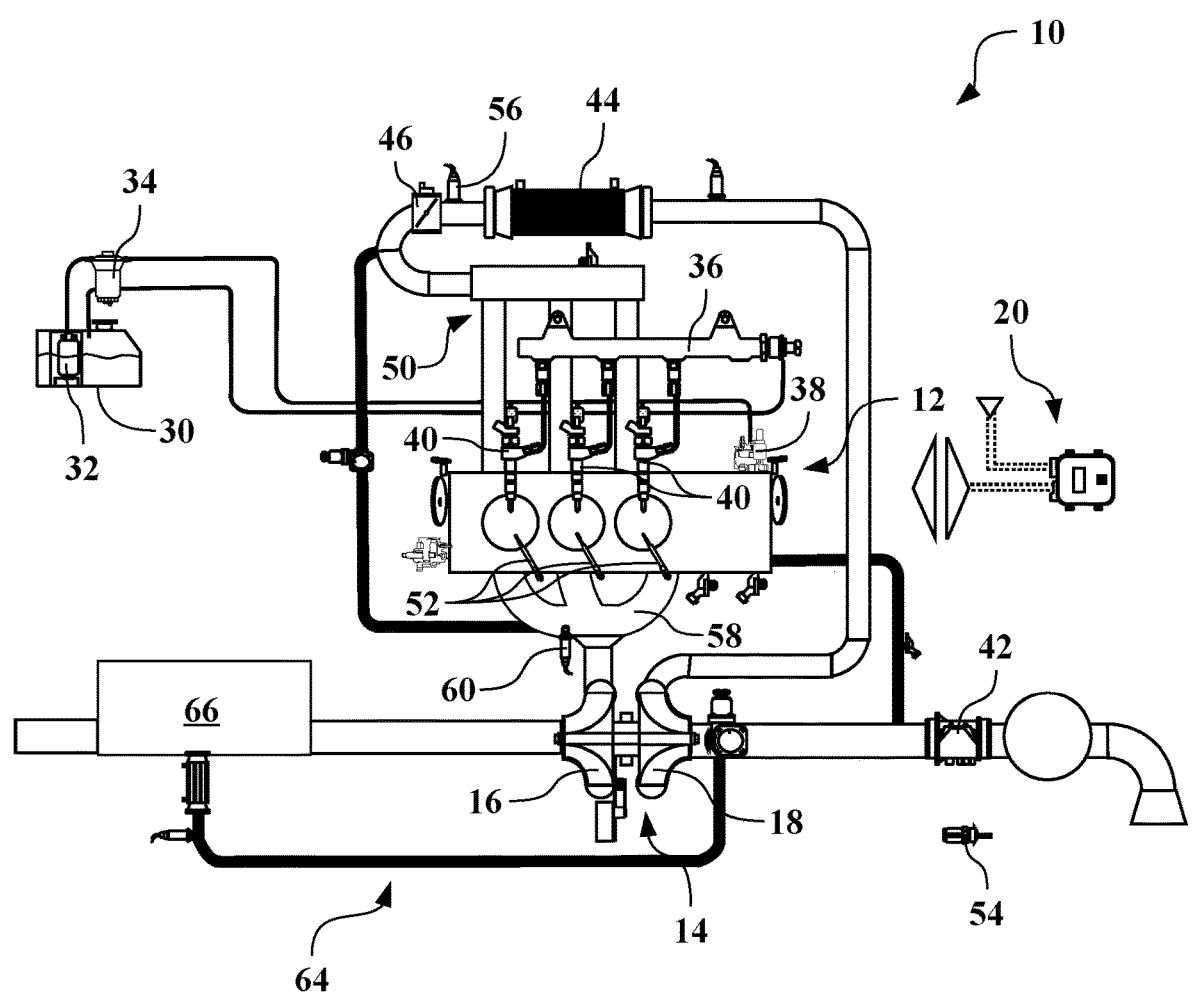
FIG. 1 is a schematic diagram of a powertrain for a vehicle.

In the drawings, like reference numbers correspond to like or similar components whenever possible throughout the several figures. There is shown in FIG. 1 a schematic diagram of a portion of a powertrain 10 for a vehicle. The powertrain 10 includes an internal combustion engine (ICE), which may be referred to as engine 12. In the exemplary powertrain 10 shown, the engine 12 is a diesel engine. However, other internal combustion engines may be used with the methods, processes, and techniques described herein. The structures described relative to the powertrain 10 are illustrative only, and many other configurations of the powertrain 10, such as those having additional or fewer components, may be used, as would be recognized by skilled artisans.

The powertrain 10 also includes a turbocharger 14. Exhaust gasses from the engine 12 pass through a turbine 16 that is connected to a compressor 18, which pressurizes intake gasses for the engine 12. Different types of turbochargers may be used, such as fixed or variable vane, in addition to superchargers. Alternatively, the methods, processes, and techniques described herein may be used with naturally aspirated engines.

While the disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

When used herein, the term substantially refers to relationships that are, ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance. For example, coverages, areas, or distances may generally be within 10% of perfection for substantial equivalence. Similarly, relative alignments, such as parallel or perpendicular, may generally be considered to be within 5%.

A control system, computer, or controller 20, which may be the ECU for the entire vehicle, is linked to the powertrain 10 and may be linked to other systems of the vehicle. The controller 20 has sufficient memory and processing power to interact with the components, and equivalents thereof, described herein and to execute the process or functions, and equivalents thereof, described herein.

The controller 20 may be illustrative of multiple control architectures, such that individual processes or tasks are conducted by different structures. Skilled artisans will recognize numerous controller architectures that may be used to execute any and all of the functions described herein, in addition to reasonable equivalents or modifications.

FIG. 1 illustrates several elements of the powertrain 10, however, not all elements are numbered or labeled herein.

Skilled artisans will recognize the unlabeled components, and will recognize that additional componentry may be used with the powertrain 10, the engine 12, or both. Note that electrical connections or communications paths are not shown in the schematic diagram of FIG. 1. However, any needed communications networks and protocols may be used within the powertrain 10 and the remainder of the vehicle, as will be recognized by skilled artisans.

A fuel tank 30 holds fuel, such as diesel fuel, that is transferred by a low-pressure fuel pump 32. Other related componentry may include fuel level, temperature, or pressure sensing. Fuel passes through a fuel filter heater relay 34, a low volume rail 36, and a high-pressure fuel pump 38 on its way to a plurality of solenoid injectors 40 at the cylinders of the engine 12.

Intake air flows through a mass airflow (MAF) sensor 42 before passing through the compressor 18 and an air cooler 44. A throttle valve 46 selectively sends air through an intake manifold 50 to the cylinders of the engine 12. One or more glow plugs 52 may be included in diesel configurations of the engine 12.

An outside air temperature sensor 54 communicates the ambient air temperature to the controller 20. An intake temperature sensor 56 communicates, to the controller 20, the temperature of gases entering the engine 12.

Exhaust gasses from the engine 12 exit through an exhaust manifold 58, which includes an exhaust manifold temperature sensor 60. As described herein, raw data from the exhaust manifold temperature sensor 60 will be used by the controller 20 for the method of improved data sensing and estimation. An exhaust gas recirculation (EGR) system 64, which includes sensors and coolers, and an after treatment system 66 are included in the powertrain 10.

The sensed temperature of the exhaust manifold 58 may be used for many purposes, including diagnostics of the engine 12. The temperature may also be used for alteration of input conditions, in order to better meet expectations of the driver of the vehicle or systems controlling the behavior of the vehicle.

However, the temperature sensed by, and output from, the exhaust manifold temperature sensor 60 may lag the actual temperature within the exhaust manifold 58. This may be particularly true during transient events, such as during a substantial demand increase on the engine 12 resulting from the driver requesting more torque (tip-in). The exhaust manifold temperature sensor 60, and many other sensors, may be subject to dynamic measurement delays. The delay may be overcome with complex (or expensive) sensors, but that may not be feasible in some applications of the powertrain 10.

Figure 2:
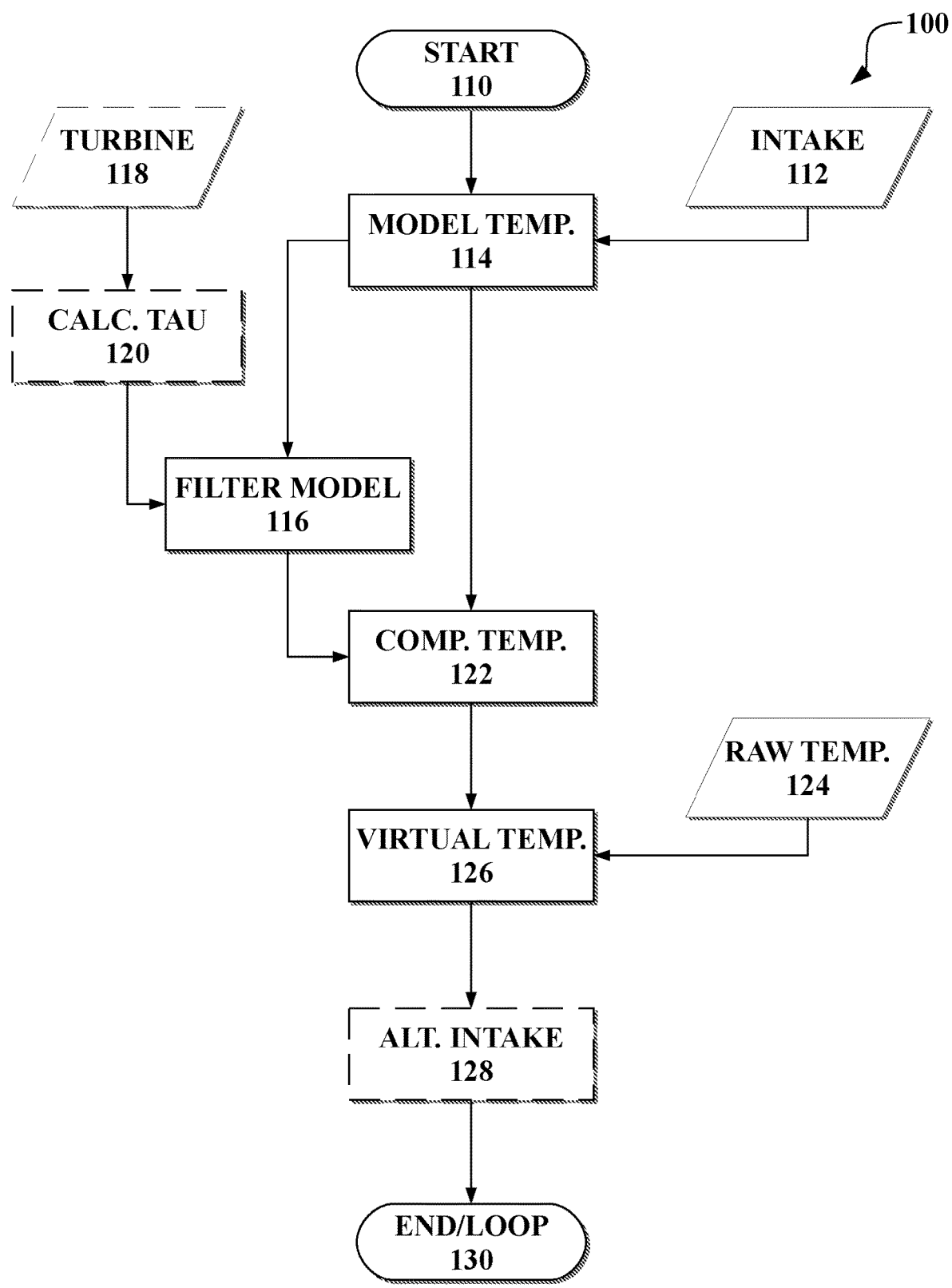
FIG. 2 is a schematic flow chart illustrating one algorithm, process, or method for sensing and estimating data, such as temperatures.

Referring to FIG. 2, and with continued reference to FIG. 1, there is shown a method 100 for improved sensing and estimation of temperatures, such as those at different locations of the powertrain 10. The improved data is more accurate than either raw sensed data or modeled data. However, note that the method 100 need not be executed with temperature data, and may be executed to create improved virtual data for any sensor data that may be modeled, as explained herein. As used herein, virtual data, or a virtual parameter, refers to data generated through a combination of both sensed and modeled data. The powertrain 10 is only a representative system for using the techniques of determining virtual data described herein.

The steps illustrated in FIG. 2 are exemplary of one specific algorithm or process and are not limiting. No specific step is required, and any steps may be optional, whether or not identified as such. The order the steps or processes shown is also not limiting. As recognized by skilled artisans, steps may be reordered or realigned.

Step 110: Start/Initialize.

The method 100 may begin operation only when called upon by the controller 20, such as when the engine 12 is running, and the method 100 may be constantly running or looping. The method 100 may be executed by the controller 20, and seeks to better estimate the temperature at a measurement point.

In the exemplary configuration of the method 100, the measurement point is at the exhaust manifold 58 of the internal combustion engine 12, such that the measurement point is looking at the temperature of exhaust gases. The measurement point may generally coincide with the location of the exhaust manifold temperature sensor 60, such that the exhaust manifold temperature sensor 60 is, ideally, reading temperature data at the measurement point.

Step 112: Determine Input Conditions.

The method 100 includes determining input conditions to the engine 12. The intake conditions may include fuel used, intake temperature, and airflow to the engine 12. Airflow may refer to volumetric or mass airflow, and may include change in airflow over time (e.g., the airflow input condition may be the time derivative of the mass airflow through the MAF sensor 42). Additional input conditions may also be used by the method 100 and the controller 20.

Step 114: Model Temperature.

Using the input conditions, the method 100 calculates a modeled temperature for the gases at the measurement point of the engine 12. The modeled temperature is determined from a physics-based model or function, which estimates the effects of combustion on the exhaust gases, based on estimates of the inputs to said combustion.

For example, and without limitation, the modeled temperature, $T_{mdl}$ may be expressed as: $T_{mdl}=f_2(fuel, dm/dt, T_i)$. Where dm/dt is the rate of change in the mass airflow and $T_i$ is the intake temperature, which may be measured by the intake temperature sensor 56 or may be determined at other locations along the intake for the engine 12.

One exemplary function for the physics-based model, $f_2$, is: $K_1*T_i+K_2*fuel/(fuel+dm/dt)+K_3$. Where $K_1$, $K_2$, and $K_3$ are scalar calibration parameters, which may be determined from bench testing or other experimentation specific, or generic, to the powertrain 10 and engine 12. Note that other physics-based functions may be used to model the temperature of exhaust gases leaving the internal combustion engine 12.

Note that the model, even with tested and generated scalar calibration parameters, is an imperfect estimate of the exhaust temperature within the exhaust manifold 58. However, due to the dynamic measurement delays of the exhaust manifold temperature sensor 60, the model may generate better temperature data than the exhaust manifold temperature sensor 60 under transient circumstances.

Step 116: Filter Model.

The method 100 includes filtering the modeled temperature to determine a filtered temperature, which may be expressed as $T_{mdl\_flt}$. Filtering the modeled temperature further smoothes the effects of transient conditions on the model itself. For example, a low-pass filter may be used.

One example of a digital low-pass filter that may be used on the modeled temperature is: $T_{mdl\_flt}(k)=T_{mdl\_flt}(k-1)+[t_s/(\tau_f+t_s)]*[T_{mdl}(k)-T_{mdl\_flt}(k-1)]$. Where $T_{mdl\_flt}(k)$ is the current filtered sample; $T_{mdl\_flt}(k-1)$ is the previous sample; $t_s$ is the sampling time; and $\tau_f$ is the low-pass filter time constant. However, note that other filter functions may used.

Step 118: Determine Turbine Conditions.

The method 100 may, optionally, determine conditions at the turbine 16. In particular, the controller 20 may monitor or determine the mass flow through the turbine, $m_{turb}$, from which the controller 20 may determine the time rate of change of mass flow through the turbine, $dm_{turb}/dt$.

Step 120: Calculate Time Constant.

From the turbine conditions, the method 100 may, optionally, calculate the time constant, $\tau_f$, for the low-pass filter based on current operating conditions of the engine 12, as opposed to a fixed value time constant. The time constant may be determined as a function of the time change of mass flow through the turbine 16, such that $\tau_f = f_1(dm_{turb}/dt)$. The function, $f_1$, may be determined through calibration during bench testing of the turbine 16, the engine 12, or both.

The controller 20 may find $\tau_f$ based on reference to a two or three-dimensional look up table, or may be a linear function that is referenced by the controller 20. Alternatively, the time constant for the low-pass filter may be a fixed value, or may be determined based on other functions or look up tables calibrated based on other factors.

Using a variable time constant for the low-pass filter may improve the response of the low-pass filter and may improve the resulting temperature determined by the method 100. The improvement in the temperature determined by the method 100 may, in turn, allow less expensive sensors to be used for the exhaust manifold temperature sensor 60.

Step 122: Determine Compensation Temperature.

The method 100 calculates a differential between the modeled temperature (determined in step 114) and the filtered temperature (determined in step 116) to determine a compensation term or compensation temperature. The compensation temperature represents the difference between the actual model results, which may be subject to transient conditions, and the filtered results, which are less subject to transient conditions.

When in steady state, the compensation temperature will move toward zero, as the filtered and modeled temperatures will be substantially equal. Therefore, the compensation temperature is non-zero during rapid changes in the modeled temperature, such as those occurring as a result of transient conditions in the engine 12.

Step 124: Sense Raw Temperature.

The model 100 determines a raw-sensed temperature from a sensor at the measurement point. In the configuration of the powertrain 10 shown in FIG. 1, the raw data comes from the exhaust manifold temperature sensor 60, which is located at, or near, the measurement point. Again, note that the raw-sensed data may be subject to dynamic lag during, in particular, transient events.

Step 126: Calculate Virtual Temperature.

The method 100 combines the raw-sensed temperature with the compensation temperature to calculate a virtual temperature for the gases at the measurement point. The virtual temperature is a combination of both sensed and modeled temperature data. The virtual temperature represents an improvement (i.e., it is more accurate) over both the raw-sensed temperature, which may suffer from dynamic lag, and the modeled temperature, which is, by its very nature, a modeled estimate.

Having more accurate temperature data improves operation of the controller 20, the engine 12, and the powertrain 10. The virtual temperature may be used for onboard, or off board, diagnostic purposes by the controller 20 or other computational equipment. Additionally, the virtual temperature determined by the method 100 may allow use of less complex, or less expensive, sensors as the exhaust manifold temperature sensor 60.

Furthermore, note that the virtual data determined or calculated by the method 100 need not be an exhaust temperature, or even a temperature. The method 100 may be applied to any combination of sensor data and modeled data. The modeled data may still be filtered, and then used to determine a compensation term, which may be combined with the raw-sensed data to calculate virtual data that is an improvement over either the raw-sensed data or the modeled data.

Step 128: Alter Intake Conditions.

Additionally, the method 100 has the option of using the virtual temperature to alter one or more inputs to the internal combustion engine 12. For example, the virtual temperature data may be used to vary the vane angles of the turbocharger 14 to alter the amount of boost generated at the intake. The virtual temperature may also be used to alter operation of the EGR system 64, in addition to other characteristics that would be recognized by skilled artisans.

Note however, that the virtual data provides an improvement to operation of the controller 20 and the powertrain 10, even when not directly used to alter current operating conditions of the vehicle. The controller 20 may store the virtual data for subsequent use or diagnostics.

Step 130: End/Loop.

The method 100 may be running constantly, such that all steps may be occurring at any time. Alternatively, the method 100 may loop iteratively, such as on a schedule. Irrespective, when the method 100 reaches the end, it is likely that the process may repeat as long as any initialization conditions exist. Therefore, after reaching the end step 130, the method may proceed back to start step 110.

Figure 3:
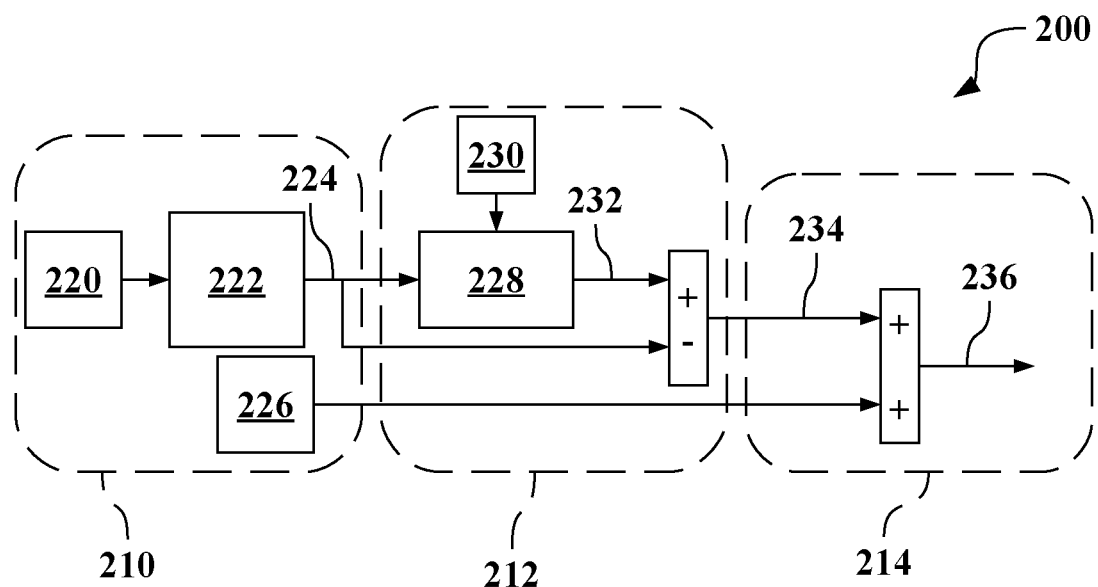
FIG. 3 is a schematic diagram of a formula or process used for determining virtual data or virtual parameters from sensed and modeled data.

Referring now to FIG. 3, and with continued reference to FIGS. 1-2, there is shown a process 200 for using data inputs to determine virtual data, similar to the virtual temperatures discussed above. The process 200 can be applied to, or overlaid on, the flow chart of the method 100, and includes similar inputs and processes, but is broadly applicable beyond exhaust temperatures to any system having a combination of sensed and modeled data.

The process 200 includes three basic regions or sections: a model region 210, a filter region 212, and a compensation-output region 214. The process 200 for calculating virtual data may be executed by any computer, controller, or control system having sufficient processing, storage, and communication capabilities.

In the model region 210, a set of input conditions 220 are fed into a model function 222. One exemplary function for model is $f_2$, described above relative to step 114 of the method 100. The model function 222 outputs modeled data 224. Substantially simultaneously, raw sensor data 226 is being captured.

In the filter region 212, a filter function 228 is applied to the modeled data 224. In some configurations, the filter function 228 may be subject to a variable time constant function 230. Examples of both the filter function 228 and the variable time constant function 230 are included above in the description of the method 100, although skilled artisans will recognize additional functions that may be used for the same purposes. The filter region outputs filtered model data 232.

In the compensation-output region 214, a compensation term 234 is determined based on the differential between the filtered model data 232 and the modeled data 224. The compensation term 234 is the difference between the raw modeled data 224 and the filtered model data 232, which is less subject to transient conditions.

Virtual data 236 is created by the combination (or summation) of the compensation term 234 and the raw sensor data 226. The virtual data 236 is the output of the process 200, and represents improved (more accurate) data over either the raw sensor data 226 or the modeled data 224, both of which were different estimates of the actual conditions and were determined at substantially the same time. The virtual data was generated through a combination of both sensed and modeled data, with additional techniques applied thereto.

As transient conditions move toward steady state operation, the compensation term 234 moves toward zero, and the raw sensor data 226 becomes more reliable. Therefore, under steady state conditions, the virtual data 236 is less affected by the modeled data 224 and substantially relies on the raw sensor data 226, but during transient conditions, the virtual data 236 is more affected by the modeled data 224, which supplements the raw sensor data 226.

Figure 4:
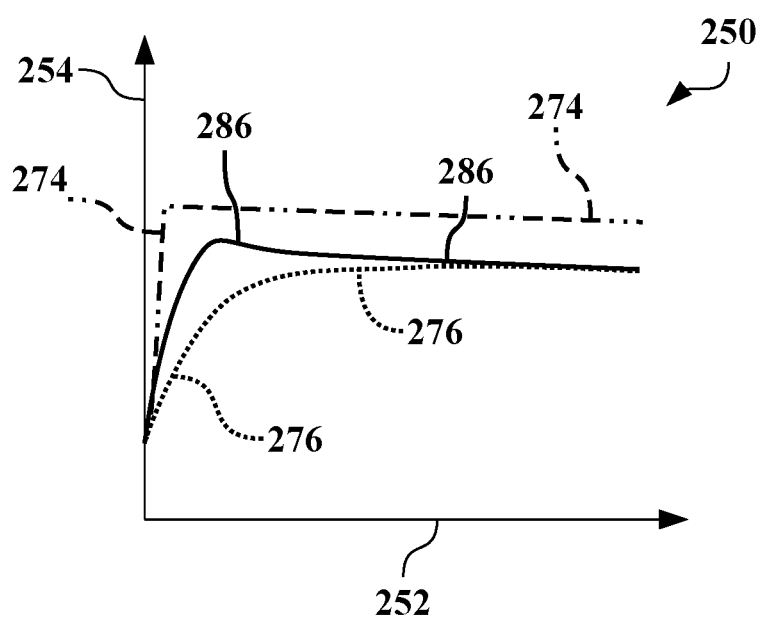
FIG. 4 is a schematic graphical illustration of data outputs from the process illustrated in FIG. 3.

Referring now to FIG. 4, and with continued reference to FIGS. 1-3, there is shown a schematic chart 250 illustrating different data sets following a transient event. For example, the chart 250 may illustrate data sets used, or output, by the process 200 shown in FIG. 3.

An x-axis 252 represents time. The origin of the x-axis 252 may be considered to occur substantially at the beginning of a transient event, with movement toward steady state conditions as time progresses. A y-axis 254 represents the value of the different data sets.

A line 274 represents modeled data, which may be denoted $y_{mdl}$. A line 276 represents raw sensor data, which may be denoted $y_s$. A line 286 represents virtual data, such as that output by the process 200, which may be denoted $y_{out}$. The virtual data on line 286 is generated from techniques applied to a combination of both sensed and modeled data.

During a transient event, the raw sensor data, $y_s$, is slow to respond, as shown by line 276. However, the modeled data, $y_{mdl}$, is quicker to respond, as shown by line 274. During this period the difference between the filtered model data and the modeled data produces a non-zero compensation term, such that the virtual data output, $y_{out}$, is between the modeled data and the raw sensor data, as shown by the line 286.

Under steady state conditions, the modeled data and the filtered model data converge, which drives the compensation term toward zero. Therefore, under steady state conditions $y_{out}$, line 286, and $y_s$, line 276, converge, as illustrated in the chart 250.

The detailed description and the drawings or figures are supportive and descriptive of the subject matter discussed herein. While some of the best modes and other embodiments have been described in detail, various alternative designs, embodiments, and configurations exist.

The invention claimed is:

1. A method for determining, with a controller, virtual temperature of a system having an internal combustion engine, at a measurement point having a sensor, comprising:
    calculating modeled temperature at the measurement point, wherein the measurement point and the sensor are located at an exhaust of the internal combustion engine;
    filtering the modeled temperature to determine filtered temperature;
    calculating a differential between the modeled temperature and the filtered temperature to determine a compensation term;
    determining raw-sensed temperature from the sensor at the measurement point;
    combining the raw-sensed temperature with the compensation temperature to calculate the virtual temperature of the exhaust gases at the measurement point; and
    using the virtual temperature to alter an input to the internal combustion engine.

2. The method of claim 1,
    wherein the modeled temperature is determined from a physics-based model.

3. The method of claim 1,
    wherein the physics-based model includes a function with inputs including fuel, intake temperature, and airflow.

4. The method of claim 1,
    wherein filtering the modeled temperature includes using a low-pass filter.

5. The method of claim 4, wherein the internal combustion engine includes a turbocharger, and further comprising:
    calculating a time constant for the low-pass filter, wherein the time constant is determined as a function of the time change of mass flow through a turbine of the turbocharger.

6. The method of claim 5,
    wherein the modeled temperature is determined from a physics-based model.

7. The method of claim 6,
    wherein the physics-based model includes a function with inputs including fuel, intake temperature, and airflow.

8. A control system configured to determine temperature of gases at a measurement point of an internal combustion engine having a turbocharger, the control system comprising at least one controller configured to:
    calculate a modeled temperature for the gases at the measurement point of the internal combustion engine;
    filter the modeled temperature to determine a filtered temperature;
    calculate a differential between the modeled temperature and the filtered temperature to determine a compensation temperature;
    determine a raw-sensed temperature from a sensor at the measurement point;
    combine the raw-sensed temperature with the compensation temperature to determine a virtual temperature for the gases; and
    alter an input to the internal combustion engine by varying a vane angle of the turbocharger based on the determined virtual temperature.

9. The control system of claim 8,
    wherein the measurement point is at an exhaust of the internal combustion engine, such that the gases are exhaust gases.

10. The control system of claim 8,
    wherein the controller is configured to determine the modeled temperature from a physics-based model that includes a function with inputs including fuel, intake temperature, and airflow; and
    wherein the controller includes a low-pass filter that is configured to filter the modeled temperature.

11. The control system of claim 10, the controller being further configured to:
    calculate a time constant for the low-pass filter, wherein the time constant is determined as a function of the time change of mass flow through a turbine of the turbocharger.

12. A control system configured to determine temperature of gases at a measurement point of an internal combustion engine having an exhaust gas recirculation (EGR) system, the control system comprising at least one controller configured to:
- calculate a modeled temperature for the gases at the measurement point of the internal combustion engine;
- filter the modeled temperature to determine a filtered temperature;
- calculate a differential between the modeled temperature and the filtered temperature to determine a compensation temperature;
- determine a raw-sensed temperature from a sensor at the measurement point;
- combine the raw-sensed temperature with the compensation temperature to determine a virtual temperature for the gases; and
- alter an input to the internal combustion engine by varying the amount of exhaust recirculated through the EGR system based on the determined virtual temperature,
- wherein the measurement point is at an exhaust of the internal combustion engine, such that the gases are exhaust gases.

13. The control system of claim 12, wherein the controller is configured to determine the modeled temperature from a physics-based model that includes a function with inputs including fuel, intake temperature, and airflow; and wherein the controller includes a low-pass filter that is configured to filter the modeled temperature.

\* \* \* \* \*